US007778422B2

(12) United States Patent
Freeman et al.

(10) Patent No.: US 7,778,422 B2
(45) Date of Patent: Aug. 17, 2010

(54) SECURITY ASSOCIATIONS FOR DEVICES (75) Inventors: Trevor W. Freeman, Sammamish, WA (US); Tim Moore, Bellevue, WA (US); Bernard Aboba, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 10/789,809

(22) Filed: Feb. 27, 2004

(65) Prior Publication Data

US 2005/0193203 A1     Sep. 1, 2005

(51) Int. Cl.
| H04K 1/00 | (2006.01) |
| H04L 9/00 | (2006.01) |
| H04L 9/30 | (2006.01) |
| H04L 9/08 | (2006.01) |
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |

(52) U.S. Cl. .................. 380/278; 380/30; 380/258; 380/259; 726/17
(58) Field of Classification Search ............ 380/30, 380/258, 259, 278; 726/17
See application file for complete search history.

(56) References Cited

U.S. PATENT DOCUMENTS

| 4,200,770 | A | * | 4/1980 | Hellman et al. | ............... | 380/30 |
| 4,218,582 | A | * | 8/1980 | Hellman et al. | ............... | 380/30 |
| 4,405,829 | A | * | 9/1983 | Rivest et al. | ................. | 380/30 |
| 4,424,414 | A | * | 1/1984 | Hellman et al. | ............... | 380/30 |
| 5,031,089 | A | | 7/1991 | Liu et al. | | |
| 5,115,505 | A | | 5/1992 | Bishop et al. | | |
| 5,220,621 | A | | 6/1993 | Saitoh | | |
| 5,430,810 | A | | 7/1995 | Saeki | | |
| 5,490,276 | A | | 2/1996 | Doli, Jr. et al. | | |
| 5,499,357 | A | | 3/1996 | Sonty et al. | | |
| 5,504,921 | A | | 4/1996 | Dev et al. | | |
| 5,557,774 | A | | 9/1996 | Shimabukuro et al. | | |
| 5,579,482 | A | | 11/1996 | Einkauf et al. | | |
| 5,668,995 | A | | 9/1997 | Bhat | | |
| 5,686,940 | A | | 11/1997 | Kuga | | |

(Continued)

FOREIGN PATENT DOCUMENTS

CN         1368694         9/2002

(Continued)

OTHER PUBLICATIONS

Enhanced IP Services for Cisco Networks Excerpt http://proquest.safaribooksonline.com/1578701066/ch07lev1sec3#snippet Pub Date: Sep. 23, 1999.*

(Continued)

*Primary Examiner*—Kambiz Zand
*Assistant Examiner*—Benjamin A Kaplan
(74) *Attorney, Agent, or Firm*—Lee & Hayes, PLLC (57) ABSTRACT

Generating symmetric keys among distributed appliances, includes generating public and private values on at least one appliance, importing a public value from another appliance via an out-of-band entity, and generating a secret value as a function of the private value corresponding to the local appliance and the public value received from the other appliance.

32 Claims, 5 Drawing Sheets

U.S. PATENT DOCUMENTS

| | | |
|---|---|---|
| 5,724,508 A | 3/1998 | Harple, Jr. et al. |
| 5,748,958 A | 5/1998 | Van Renesse |
| 5,758,351 A | 5/1998 | Gibson et al. |
| 5,768,271 A | 6/1998 | Seid et al. |
| 5,774,660 A | 6/1998 | Brendel et al. |
| 5,774,689 A | 6/1998 | Curtis et al. |
| 5,784,463 A | 7/1998 | Chen et al. |
| 5,790,895 A | 8/1998 | Krontz et al. |
| 5,801,970 A | 9/1998 | Rowland et al. |
| 5,802,590 A | 9/1998 | Draves |
| 5,815,574 A | 9/1998 | Fortinsky |
| 5,818,937 A | 10/1998 | Watson et al. |
| 5,822,531 A | 10/1998 | Gorczyca et al. |
| 5,826,015 A | 10/1998 | Schmidt |
| 5,845,124 A | 12/1998 | Berman |
| 5,845,277 A | 12/1998 | Pfeil et al. |
| 5,867,706 A | 2/1999 | Martin et al. |
| 5,872,928 A | 2/1999 | Lewis et al. |
| 5,878,220 A | 3/1999 | Olkin et al. |
| 5,895,499 A | 4/1999 | Chu |
| 5,905,728 A | 5/1999 | Han et al. |
| 5,917,730 A | 6/1999 | Rittie et al. |
| 5,930,798 A | 7/1999 | Lawler et al. |
| 5,958,009 A | 9/1999 | Friedrich et al. |
| 5,960,371 A | 9/1999 | Saito et al. |
| 5,968,126 A | 10/1999 | Ekstrom et al. |
| 6,012,113 A | 1/2000 | Tuckner |
| 6,035,405 A | 3/2000 | Gage et al. |
| 6,041,054 A | 3/2000 | Westberg |
| 6,047,323 A | 4/2000 | Krause |
| 6,049,528 A | 4/2000 | Hendel et al. |
| 6,052,469 A | 4/2000 | Johnson et al. |
| 6,059,842 A | 5/2000 | Dumarot et al. |
| 6,065,058 A | 5/2000 | Hailpern et al. |
| 6,073,183 A | 6/2000 | Slonim |
| 6,073,227 A | 6/2000 | Abily et al. |
| 6,075,776 A | 6/2000 | Tanimoto et al. |
| 6,076,108 A | 6/2000 | Courts et al. |
| 6,081,826 A | 6/2000 | Masuoka et al. |
| 6,085,238 A | 7/2000 | Yuasa et al. |
| 6,086,618 A | 7/2000 | Al-Hilali et al. |
| 6,097,818 A | 8/2000 | Saito |
| 6,108,702 A | 8/2000 | Wood |
| 6,112,243 A | 8/2000 | Downs et al. |
| 6,115,393 A | 9/2000 | Engel et al. |
| 6,118,785 A | 9/2000 | Araujo et al. |
| 6,125,442 A | 9/2000 | Maves et al. |
| 6,125,447 A | 9/2000 | Gong |
| 6,134,594 A | 10/2000 | Helland et al. |
| 6,144,959 A | 11/2000 | Anderson et al. |
| 6,147,995 A | 11/2000 | Dobbins et al. |
| 6,151,688 A | 11/2000 | Wipfel et al. |
| 6,167,052 A | 12/2000 | McNeill et al. |
| 6,167,383 A | 12/2000 | Henson |
| 6,167,515 A | 12/2000 | Lin |
| 6,178,529 B1 | 1/2001 | Short et al. |
| 6,182,275 B1 | 1/2001 | Beelitz et al. |
| 6,185,308 B1 | 2/2001 | Ando et al. |
| 6,192,401 B1 | 2/2001 | Modiri et al. |
| 6,195,091 B1 | 2/2001 | Harple et al. |
| 6,195,355 B1 | 2/2001 | Demizu |
| 6,208,345 B1 | 3/2001 | Sheard et al. |
| 6,208,649 B1 | 3/2001 | Kloth |
| 6,209,099 B1 | 3/2001 | Saunders |
| 6,212,559 B1 | 4/2001 | Bixler et al. |
| 6,215,877 B1 | 4/2001 | Matsumoto |
| 6,215,878 B1 | 4/2001 | Harkins |
| 6,226,788 B1 | 5/2001 | Schoening et al. |
| 6,230,312 B1 | 5/2001 | Hunt |
| 6,233,610 B1 | 5/2001 | Hayball et al. |
| 6,236,365 B1 | 5/2001 | LeBlanc et al. |
| 6,236,729 B1 | 5/2001 | Takaragi et al. |
| 6,236,901 B1 | 5/2001 | Goss |
| 6,253,230 B1 | 6/2001 | Couland et al. |
| 6,256,773 B1 | 7/2001 | Bowman-Amuah |
| 6,263,089 B1 | 7/2001 | Otsuka et al. |
| 6,266,707 B1 | 7/2001 | Boden et al. |
| 6,269,076 B1 | 7/2001 | Shamir et al. |
| 6,269,079 B1 | 7/2001 | Marin et al. |
| 6,304,972 B1 | 10/2001 | Shavit |
| 6,305,015 B1 | 10/2001 | Akriche et al. |
| 6,311,144 B1 | 10/2001 | Abu El Ata |
| 6,311,270 B1 | 10/2001 | Challener et al. |
| 6,327,622 B1 | 12/2001 | Jindal et al. |
| 6,330,605 B1 | 12/2001 | Christensen et al. |
| 6,336,138 B1 | 1/2002 | Caswell et al. |
| 6,336,171 B1 | 1/2002 | Coskrey, IV |
| 6,338,112 B1 | 1/2002 | Wipfel et al. |
| 6,351,685 B1 | 2/2002 | Dimitri et al. |
| 6,353,861 B1 | 3/2002 | Dolin, Jr. et al. |
| 6,353,898 B1 | 3/2002 | Wipfel et al. |
| 6,360,265 B1 | 3/2002 | Falck et al. |
| 6,366,578 B1 | 4/2002 | Johnson |
| 6,367,010 B1 | 4/2002 | Venkatram et al. |
| 6,370,573 B1 | 4/2002 | Bowman-Amuah |
| 6,370,584 B1 | 4/2002 | Bestavros et al. |
| 6,377,996 B1 | 4/2002 | Lumelsky et al. |
| 6,389,464 B1 | 5/2002 | Krishnamurthy et al. |
| 6,393,386 B1 | 5/2002 | Zager et al. |
| 6,393,456 B1 | 5/2002 | Ambler et al. |
| 6,393,485 B1 | 5/2002 | Chao et al. |
| 6,408,390 B1 | 6/2002 | Saito |
| 6,424,718 B1 | 7/2002 | Holloway |
| 6,424,992 B2 | 7/2002 | Devarakonda et al. |
| 6,427,163 B1 | 7/2002 | Arendt et al. |
| 6,427,171 B1 | 7/2002 | Craft et al. |
| 6,438,100 B1 | 8/2002 | Halpern et al. |
| 6,442,557 B1 | 8/2002 | Buteau et al. |
| 6,442,713 B1 | 8/2002 | Block et al. |
| 6,449,650 B1 | 9/2002 | Westfall et al. |
| 6,457,048 B2 | 9/2002 | Sondur et al. |
| 6,463,536 B2 | 10/2002 | Saito |
| 6,466,985 B1 | 10/2002 | Goyal et al. |
| 6,470,025 B1 | 10/2002 | Wilson et al. |
| 6,470,464 B2 | 10/2002 | Bertram et al. |
| 6,473,791 B1 | 10/2002 | Al-Ghosein et al. |
| 6,480,955 B1 | 11/2002 | DeKoning et al. |
| 6,484,261 B1 | 11/2002 | Wiegel |
| 6,502,131 B1 | 12/2002 | Vaid et al. |
| 6,505,244 B1 | 1/2003 | Natarajan et al. |
| 6,519,615 B1 | 2/2003 | Wollrath et al. |
| 6,529,953 B1 | 3/2003 | Van Renesse |
| 6,539,494 B1 | 3/2003 | Abramson et al. |
| 6,546,423 B1 | 4/2003 | Dutta et al. |
| 6,546,553 B1 | 4/2003 | Hunt |
| 6,549,516 B1 | 4/2003 | Albert et al. |
| 6,549,934 B1 | 4/2003 | Peterson et al. |
| 6,564,261 B1 | 5/2003 | Gudjonsson et al. |
| 6,570,847 B1 | 5/2003 | Hosein |
| 6,570,875 B1 | 5/2003 | Hegde |
| 6,574,195 B2 | 6/2003 | Roberts |
| 6,578,144 B1 | 6/2003 | Gennaro et al. |
| 6,584,499 B1 | 6/2003 | Jantz et al. |
| 6,587,876 B1 | 7/2003 | Mahon et al. |
| 6,597,956 B1 | 7/2003 | Aziz et al. |
| 6,598,077 B2 | 7/2003 | Primak et al. |
| 6,598,173 B1 | 7/2003 | Sheikh et al. |
| 6,598,223 B1 | 7/2003 | Vrhel, Jr. et al. |
| 6,601,101 B1 | 7/2003 | Lee et al. |
| 6,601,233 B1 | 7/2003 | Underwood |
| 6,606,708 B1 | 8/2003 | Devine et al. |
| 6,609,148 B1 | 8/2003 | Salo et al. |
| 6,609,213 B1 | 8/2003 | Nguyen et al. |
| 6,611,522 B1 | 8/2003 | Zheng et al. |

| | | |
|---|---|---|
| 6,628,671 B1 | 9/2003 | Dynarski et al. |
| 6,631,141 B1 | 10/2003 | Kumar et al. |
| 6,640,303 B1 | 10/2003 | Vu |
| 6,651,101 B1 | 11/2003 | Gai et al. |
| 6,651,240 B1 | 11/2003 | Yamamoto et al. |
| 6,654,782 B1 | 11/2003 | O'Brien et al. |
| 6,654,796 B1 | 11/2003 | Slater et al. |
| 6,665,714 B1 | 12/2003 | Blumenau et al. |
| 6,671,699 B1 | 12/2003 | Black et al. |
| 6,675,308 B1 | 1/2004 | Thomsen |
| 6,678,821 B1 | 1/2004 | Waugh et al. |
| 6,678,835 B1 | 1/2004 | Shah et al. |
| 6,681,262 B1 | 1/2004 | Rimmer |
| 6,691,148 B1 | 2/2004 | Zinky et al. |
| 6,691,165 B1 | 2/2004 | Bruck et al. |
| 6,691,168 B1 | 2/2004 | Bal et al. |
| 6,694,436 B1 | 2/2004 | Audebert |
| 6,701,363 B1 | 3/2004 | Chiu et al. |
| 6,717,949 B1 | 4/2004 | Boden et al. |
| 6,718,361 B1 | 4/2004 | Basani et al. |
| 6,718,379 B1 | 4/2004 | Krishna et al. |
| 6,725,253 B1 | 4/2004 | Okano et al. |
| 6,728,885 B1 | 4/2004 | Taylor et al. |
| 6,735,596 B2 | 5/2004 | Corynen |
| 6,738,736 B1 | 5/2004 | Bond |
| 6,741,266 B1 | 5/2004 | Kamiwada et al. |
| 6,742,020 B1 | 5/2004 | Dimitroff et al. |
| 6,748,447 B1 | 6/2004 | Basani et al. |
| 6,754,716 B1 | 6/2004 | Sharma et al. |
| 6,754,816 B1 | 6/2004 | Layton et al. |
| 6,757,744 B1 | 6/2004 | Narisi et al. |
| 6,760,765 B1 | 7/2004 | Asai et al. |
| 6,760,775 B1 | 7/2004 | Anerousis et al. |
| 6,769,008 B1 | 7/2004 | Kumar et al. |
| 6,769,060 B1 * | 7/2004 | Dent et al. .................. 713/168 |
| 6,772,333 B1 | 8/2004 | Brendel |
| 6,779,016 B1 | 8/2004 | Aziz et al. |
| 6,782,408 B1 | 8/2004 | Chandra et al. |
| 6,789,090 B1 | 9/2004 | Miyake et al. |
| 6,801,528 B2 | 10/2004 | Nassar |
| 6,801,937 B1 | 10/2004 | Novaes et al. |
| 6,801,949 B1 | 10/2004 | Bruck et al. |
| 6,804,783 B1 | 10/2004 | Wesinger et al. |
| 6,813,778 B1 | 11/2004 | Poli et al. |
| 6,816,897 B2 | 11/2004 | McGuire |
| 6,820,121 B1 | 11/2004 | Callis et al. |
| 6,823,299 B1 | 11/2004 | Contreras et al. |
| 6,823,373 B1 | 11/2004 | Pancha et al. |
| 6,823,382 B2 | 11/2004 | Stone |
| 6,829,639 B1 | 12/2004 | Lawson et al. |
| 6,829,770 B1 | 12/2004 | Hinson et al. |
| 6,836,750 B2 | 12/2004 | Wong et al. |
| 6,845,160 B1 | 1/2005 | Aoki |
| 6,853,841 B1 | 2/2005 | St. Pierre |
| 6,854,069 B2 | 2/2005 | Kampe et al. |
| 6,856,591 B1 | 2/2005 | Ma et al. |
| 6,862,613 B1 | 3/2005 | Kumar et al. |
| 6,868,062 B1 | 3/2005 | Yadav et al. |
| 6,868,454 B1 | 3/2005 | Kubota et al. |
| 6,879,926 B2 | 4/2005 | Schmit et al. |
| 6,880,002 B2 | 4/2005 | Hirschfeld et al. |
| 6,886,038 B1 | 4/2005 | Tabbara et al. |
| 6,888,807 B2 | 5/2005 | Heller et al. |
| 6,895,534 B2 | 5/2005 | Wong et al. |
| 6,898,791 B1 | 5/2005 | Chandy et al. |
| 6,904,458 B1 | 6/2005 | Bishop et al. |
| 6,907,395 B1 | 6/2005 | Hunt et al. |
| 6,915,338 B1 | 7/2005 | Hunt et al. |
| 6,922,791 B2 | 7/2005 | Mashayekhi et al. |
| 6,928,482 B1 | 8/2005 | Ben Nun et al. |
| 6,947,987 B2 | 9/2005 | Boland |
| 6,954,930 B2 | 10/2005 | Drake et al. |
| 6,957,186 B1 | 10/2005 | Guheen et al. |
| 6,963,981 B1 | 11/2005 | Bailey et al. |
| 6,968,291 B1 | 11/2005 | Desai |
| 6,968,535 B2 | 11/2005 | Stelting et al. |
| 6,968,550 B2 | 11/2005 | Branson et al. |
| 6,968,551 B2 | 11/2005 | Hediger et al. |
| 6,971,063 B1 | 11/2005 | Rappaport et al. |
| 6,971,072 B1 | 11/2005 | Stein |
| 6,973,620 B2 | 12/2005 | Gusler et al. |
| 6,973,622 B1 | 12/2005 | Rappaport et al. |
| 6,976,079 B1 | 12/2005 | Ferguson et al. |
| 6,976,269 B1 | 12/2005 | Avery, IV et al. |
| 6,978,379 B1 | 12/2005 | Goh et al. |
| 6,983,317 B1 | 1/2006 | Bishop et al. |
| 6,985,956 B2 | 1/2006 | Luke et al. |
| 6,986,135 B2 | 1/2006 | Leathers et al. |
| 6,990,666 B2 | 1/2006 | Hirschfeld et al. |
| 7,003,562 B2 | 2/2006 | Mayer |
| 7,003,574 B1 | 2/2006 | Bahl |
| 7,012,919 B1 | 3/2006 | So et al. |
| 7,013,462 B2 | 3/2006 | Zara et al. |
| 7,016,950 B2 | 3/2006 | Tabbara et al. |
| 7,024,451 B2 | 4/2006 | Jorgenson |
| 7,027,412 B2 | 4/2006 | Miyamoto et al. |
| 7,028,228 B1 | 4/2006 | Lovy et al. |
| 7,035,786 B1 | 4/2006 | Abu El Ata et al. |
| 7,035,930 B2 | 4/2006 | Graupner et al. |
| 7,043,407 B2 | 5/2006 | Lynch et al. |
| 7,043,545 B2 | 5/2006 | Tabbara et al. |
| 7,046,680 B1 | 5/2006 | McDysan et al. |
| 7,050,961 B1 | 5/2006 | Lee et al. |
| 7,054,943 B1 | 5/2006 | Goldszmidt et al. |
| 7,058,704 B1 | 6/2006 | Mangipudi et al. |
| 7,058,826 B2 | 6/2006 | Fung |
| 7,058,858 B2 | 6/2006 | Wong et al. |
| 7,062,718 B2 | 6/2006 | Kodosky et al. |
| 7,069,204 B1 | 6/2006 | Solden et al. |
| 7,069,480 B1 | 6/2006 | Lovy et al. |
| 7,069,553 B2 | 6/2006 | Narayanaswamy et al. |
| 7,072,807 B2 | 7/2006 | Brown et al. |
| 7,072,822 B2 | 7/2006 | Humenansky et al. |
| 7,076,633 B2 | 7/2006 | Tormasov et al. |
| 7,080,143 B2 | 7/2006 | Hunt et al. |
| 7,082,464 B2 | 7/2006 | Hasan et al. |
| 7,089,281 B1 | 8/2006 | Kazemi et al. |
| 7,089,293 B2 | 8/2006 | Grosner et al. |
| 7,093,005 B2 | 8/2006 | Patterson |
| 7,093,288 B1 | 8/2006 | Hydrie et al. |
| 7,096,258 B2 | 8/2006 | Hunt et al. |
| 7,099,936 B2 | 8/2006 | Chase et al. |
| 7,103,185 B1 | 9/2006 | Srivastava et al. |
| 7,103,874 B2 | 9/2006 | McCollum et al. |
| 7,113,900 B1 | 9/2006 | Hunt et al. |
| 7,117,158 B2 | 10/2006 | Weldon et al. |
| 7,117,261 B2 | 10/2006 | Kryskow, Jr. et al. |
| 7,120,154 B2 | 10/2006 | Bavant et al. |
| 7,124,289 B1 | 10/2006 | Suorsa |
| 7,127,625 B2 | 10/2006 | Farkas et al. |
| 7,131,123 B2 | 10/2006 | Suorsa et al. |
| 7,134,011 B2 | 11/2006 | Fung |
| 7,134,122 B1 | 11/2006 | Sero et al. |
| 7,139,930 B2 | 11/2006 | Mashayekhi et al. |
| 7,139,999 B2 | 11/2006 | Bowman-Amuah |
| 7,143,420 B2 | 11/2006 | Radhakrishnan |
| 7,146,353 B2 | 12/2006 | Garg et al. |
| 7,150,015 B2 | 12/2006 | Pace et al. |
| 7,152,109 B2 | 12/2006 | Suorsa et al. |
| 7,152,157 B2 | 12/2006 | Murphy et al. |
| 7,155,380 B2 | 12/2006 | Hunt et al. |
| 7,155,490 B1 | 12/2006 | Malmer et al. |
| 7,162,427 B1 | 1/2007 | Myrick et al. |
| 7,162,509 B2 | 1/2007 | Brown et al. |
| 7,174,379 B2 | 2/2007 | Agarwal et al. |
| 7,181,731 B2 | 2/2007 | Pace et al. |

| | | | | | | |
|---|---|---|---|---|---|---|
| 7,188,335 | B1 | 3/2007 | Darr et al. | 2002/0198995 A1 | 12/2002 | Liu et al. |
| 7,191,344 | B2 | 3/2007 | Lin et al. | 2003/0008712 A1 | 1/2003 | Poulin |
| 7,191,429 | B2 | 3/2007 | Brassard et al. | 2003/0009559 A1 | 1/2003 | Ikeda |
| 7,194,439 | B2 | 3/2007 | Kassan et al. | 2003/0014644 A1 | 1/2003 | Burns et al. |
| 7,194,616 | B2 | 3/2007 | Axnix et al. | 2003/0028642 A1 | 2/2003 | Agarwal et al. |
| 7,197,418 | B2 | 3/2007 | Fuller, III et al. | 2003/0028770 A1 | 2/2003 | Litwin |
| 7,200,530 | B2 | 4/2007 | Brown et al. | 2003/0041142 A1 | 2/2003 | Zhang et al. |
| 7,200,655 | B2 | 4/2007 | Hunt et al. | 2003/0041159 A1 | 2/2003 | Tinsley et al. |
| 7,203,911 | B2 | 4/2007 | Williams | 2003/0046615 A1 | 3/2003 | Stone |
| 7,210,143 | B2 | 4/2007 | Or et al. | 2003/0051049 A1 | 3/2003 | Noy et al. |
| 7,213,231 | B1 | 5/2007 | Bandhole et al. | 2003/0056063 A1 | 3/2003 | Hochmuth et al. |
| 7,222,147 | B1 | 5/2007 | Black et al. | 2003/0065743 A1 | 4/2003 | Jenny et al. |
| 7,225,441 | B2 | 5/2007 | Kozuch et al. | 2003/0069369 A1 | 4/2003 | Belenkaya et al. |
| 7,231,410 | B1 | 6/2007 | Walsh et al. | 2003/0074395 A1 | 4/2003 | Eshghi et al. |
| 7,254,634 | B1 | 8/2007 | Davis et al. | 2003/0101284 A1 | 5/2003 | Cabrera et al. |
| 7,257,584 | B2 | 8/2007 | Hirschfeld et al. | 2003/0105963 A1 | 6/2003 | Slick et al. |
| 7,275,156 | B2 | 9/2007 | Balfanz et al. | 2003/0120763 A1 | 6/2003 | Volpano |
| 7,278,273 | B1 | 10/2007 | Whitted et al. | 2003/0126464 A1 | 7/2003 | McDaniel et al. |
| 7,281,154 | B2 | 10/2007 | Mashayekhi et al. | 2003/0130833 A1 | 7/2003 | Brownell et al. |
| 7,302,608 | B1 | 11/2007 | Acharya et al. | 2003/0138105 A1 | 7/2003 | Challener et al. |
| 7,305,549 | B2 | 12/2007 | Hunt et al. | 2003/0165140 A1 | 9/2003 | Tang et al. |
| 7,305,561 | B2 | 12/2007 | Hunt et al. | 2003/0200293 A1 | 10/2003 | Fearn et al. |
| 7,313,573 | B2 | 12/2007 | Leung et al. | 2003/0204734 A1 | 10/2003 | Wheeler |
| 7,315,801 | B1 | 1/2008 | Dowd et al. | 2003/0214908 A1 | 11/2003 | Kumar et al. |
| 7,333,000 | B2 | 2/2008 | Vassallo | 2003/0217263 A1 | 11/2003 | Sakai |
| 7,349,891 | B2 | 3/2008 | Charron et al. | 2003/0225563 A1 | 12/2003 | Gonos |
| 7,350,068 | B2 | 3/2008 | Anderson et al. | 2004/0002878 A1* | 1/2004 | Maria Hinton ................. 705/7 |
| 7,350,186 | B2 | 3/2008 | Coleman et al. | 2004/0049365 A1 | 3/2004 | Keller et al. |
| 7,366,755 | B1 | 4/2008 | Cuomo et al. | 2004/0049509 A1 | 3/2004 | Keller et al. |
| 7,367,028 | B2 | 4/2008 | Kodosky et al. | 2004/0054791 A1 | 3/2004 | Chakraborty et al. |
| 7,370,103 | B2 | 5/2008 | Hunt et al. | 2004/0059812 A1 | 3/2004 | Assa |
| 7,376,125 | B1 | 5/2008 | Hussain et al. | 2004/0068631 A1 | 4/2004 | Ukeda et al. |
| 7,379,982 | B2 | 5/2008 | Tabbara | 2004/0073443 A1 | 4/2004 | Gabrick et al. |
| 7,386,721 | B1 | 6/2008 | Vilhuber et al. | 2004/0073795 A1* | 4/2004 | Jablon ........................ 713/171 |
| 7,395,320 | B2 | 7/2008 | Hunt et al. | 2004/0078787 A1 | 4/2004 | Borek et al. |
| 7,403,901 | B1 | 7/2008 | Carley et al. | 2004/0111315 A1 | 6/2004 | Sharma et al. |
| 7,404,175 | B2 | 7/2008 | Lee et al. | 2004/0117438 A1 | 6/2004 | Considine et al. |
| 7,406,517 | B2 | 7/2008 | Hunt et al. | 2004/0117476 A1 | 6/2004 | Steele et al. |
| 7,406,692 | B2 | 7/2008 | Halpern et al. | 2004/0160386 A1 | 8/2004 | Michelitsch et al. |
| 7,409,420 | B2 | 8/2008 | Pullara et al. | 2004/0161111 A1* | 8/2004 | Sherman .................... 380/283 |
| 7,461,249 | B1 | 12/2008 | Pearson et al. | 2004/0193388 A1 | 9/2004 | Outhred et al. |
| 7,464,147 | B1 | 12/2008 | Fakhouri et al. | 2004/0199572 A1 | 10/2004 | Hunt et al. |
| 7,624,086 | B2 | 11/2009 | Keith, Jr. | 2004/0205179 A1 | 10/2004 | Hunt et al. |
| 2001/0014158 | A1 | 8/2001 | Baltzley | 2004/0208292 A1 | 10/2004 | Winterbottom |
| 2001/0016909 | A1 | 8/2001 | Gehrmann | 2004/0226010 A1 | 11/2004 | Suorsa |
| 2001/0020228 | A1* | 9/2001 | Cantu et al. ..................... 705/1 | 2004/0261079 A1 | 12/2004 | Sen |
| 2001/0039586 | A1 | 11/2001 | Primak et al. | 2004/0264481 A1 | 12/2004 | Darling et al. |
| 2001/0047400 | A1 | 11/2001 | Coates et al. | 2004/0267920 A1 | 12/2004 | Hydrie et al. |
| 2001/0051937 | A1 | 12/2001 | Ross et al. | 2004/0268357 A1 | 12/2004 | Joy et al. |
| 2002/0009079 | A1 | 1/2002 | Jungck et al. | 2004/0268358 A1 | 12/2004 | Darling et al. |
| 2002/0010771 | A1 | 1/2002 | Mandato | 2005/0008001 A1 | 1/2005 | Williams et al. |
| 2002/0022952 | A1 | 2/2002 | Zager et al. | 2005/0021742 A1 | 1/2005 | Yemini et al. |
| 2002/0038421 | A1 | 3/2002 | Hamada | 2005/0055435 A1 | 3/2005 | Gbadegesin et al. |
| 2002/0040402 | A1 | 4/2002 | Levy-Abegnoli et al. | 2005/0080811 A1 | 4/2005 | Speeter et al. |
| 2002/0049573 | A1 | 4/2002 | El Ata | 2005/0086502 A1 | 4/2005 | Rayes et al. |
| 2002/0057684 | A1 | 5/2002 | Miyamoto et al. | 2005/0091078 A1 | 4/2005 | Hunt et al. |
| 2002/0069267 | A1 | 6/2002 | Thiele | 2005/0091227 A1 | 4/2005 | McCollum et al. |
| 2002/0069369 | A1 | 6/2002 | Tremain | 2005/0097097 A1 | 5/2005 | Hunt et al. |
| 2002/0075844 | A1 | 6/2002 | Hagen | 2005/0097146 A1 | 5/2005 | Konstantinou et al. |
| 2002/0082820 | A1 | 6/2002 | Ferguson et al. | 2005/0102388 A1 | 5/2005 | Tabbara et al. |
| 2002/0087264 | A1 | 7/2002 | Hills et al. | 2005/0102513 A1 | 5/2005 | Alve |
| 2002/0090089 | A1 | 7/2002 | Branigan | 2005/0125212 A1 | 6/2005 | Hunt et al. |
| 2002/0120761 | A1 | 8/2002 | Berg | 2005/0138416 A1 | 6/2005 | Qian et al. |
| 2002/0131601 | A1 | 9/2002 | Ninomiya | 2005/0152270 A1 | 7/2005 | Gomez Paredes et al. |
| 2002/0138551 | A1 | 9/2002 | Erickson | 2005/0192971 A1 | 9/2005 | Tabbara et al. |
| 2002/0152086 | A1* | 10/2002 | Smith et al. ..................... 705/1 | 2005/0193103 A1 | 9/2005 | Drabik |
| 2002/0156900 | A1 | 10/2002 | Marquette et al. | 2005/0246529 A1 | 11/2005 | Hunt et al. |
| 2002/0161839 | A1 | 10/2002 | Colasurdo et al. | 2005/0246771 A1 | 11/2005 | Hunt et al. |
| 2002/0171690 | A1 | 11/2002 | Fox et al. | 2005/0251783 A1 | 11/2005 | Torone et al. |
| 2002/0184327 | A1 | 12/2002 | Major et al. | 2005/0257244 A1 | 11/2005 | Joly et al. |
| 2002/0194342 | A1 | 12/2002 | Lu et al. | 2005/0268325 A1 | 12/2005 | Kuno et al. |
| 2002/0194345 | A1 | 12/2002 | Lu et al. | 2006/0025984 A1 | 2/2006 | Papaefstathiou et al. |
| 2002/0194369 | A1 | 12/2002 | Rawlings et al. | 2006/0025985 A1 | 2/2006 | Vinberg et al. |

| | | | |
|---|---|---|---|
| 2006/0031248 | A1 | 2/2006 | Vinberg et al. |
| 2006/0034263 | A1 | 2/2006 | Outhred et al. |
| 2006/0037002 | A1 | 2/2006 | Vinberg et al. |
| 2006/0048017 | A1 | 3/2006 | Anerousis et al. |
| 2006/0123040 | A1 | 6/2006 | McCarthy et al. |
| 2006/0149838 | A1 | 7/2006 | Hunt et al. |
| 2006/0155708 | A1 | 7/2006 | Brown et al. |
| 2006/0161879 | A1 | 7/2006 | Lubrecht et al. |
| 2006/0161884 | A1 | 7/2006 | Lubrecht et al. |
| 2006/0232927 | A1 | 10/2006 | Vinberg et al. |
| 2006/0235664 | A1 | 10/2006 | Vinberg et al. |
| 2006/0259609 | A1 | 11/2006 | Hunt et al. |
| 2006/0259610 | A1 | 11/2006 | Hunt et al. |
| 2006/0271341 | A1 | 11/2006 | Brown et al. |
| 2007/0006177 | A1 | 1/2007 | Aiber et al. |
| 2007/0112847 | A1 | 5/2007 | Dublish et al. |
| 2007/0192769 | A1 | 8/2007 | Mimura et al. |
| 2008/0059214 | A1 | 3/2008 | Vinberg et al. |

FOREIGN PATENT DOCUMENTS

| | | |
|---|---|---|
| CN | 1375685 | 10/2002 |
| EP | 0964546 | 12/1999 |
| EP | 1180886 A1 | 2/2002 |
| EP | 1307018 A1 | 5/2003 |
| JP | 8297567 | 11/1996 |
| JP | 11340980 A | 12/1999 |
| JP | 2000293497 A | 10/2000 |
| JP | 2001339437 A | 12/2001 |
| JP | 2002084302 | 3/2002 |
| JP | 2002354006 A | 12/2002 |
| JP | 2003532784 | 11/2003 |
| RU | 2111625 C1 | 5/1998 |
| RU | 2189072 C2 | 9/2002 |
| WO | WO9853410 | 11/1998 |
| WO | WO9930514 A2 | 6/1999 |
| WO | WO9963439 | 12/1999 |
| WO | WO0022526 | 4/2000 |
| WO | WO0031945 | 6/2000 |
| WO | WO0073929 | 12/2000 |
| WO | WO0230044 A2 | 4/2002 |
| WO | WO 0237748 | 5/2002 |
| WO | WO02085051 | 10/2002 |
| WO | WO03027876 A1 | 4/2003 |
| WO | WO03039104 | 5/2003 |

OTHER PUBLICATIONS

Pretty Good Privacy™ PGP for Personal Privacy, Version 5.0 For Windows® 95 Windows NT ftp://ftp.pgpi.org/pub/pgp/5.0/manual/win95nt/english/pgp50manual.pdf © 1997 by Pretty Good Privacy, Inc. All rights reserved.*

C.O.B.A.S. Centralized Out-Of-Band Authentication System http://www.cybersecuritycooperation.org/documents/QT_COBAS_White_Paper.pdf Sep. 8-9, 2003.*

Handbook of Applied Cryptography by A. Menezes, P. van Oorschot, and S. Vanstone, CRC Press, 1996. Chapters 8 & 12.*

Microsoft TechNet Remote Operating System Installation Published: Sep. 9, 1999.*

Schneier, Bruce, "Applied Cryptography Protocols, Algorithms and Source Code in C, Second Edition", 1996, John Wiley & Sons, Inc., New York, p. 461, pp. 466-468, pp. 513-514.

Clifford, Kahn, "Report on DIMAC Workshop on Trust Management" Online!, Mar. 10, 2003, Retrieved from the Internet: URL: http://web.archive.ort/web/20030310045643/http://ieee-security.org/Cipher/ConfReports/conf-rep-DIMACst.html>, pp. 2-3.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html>, p. 1.

Moore, D.A., "Network interoperability Program", MILCOM 97 Proceedings, vol. 3, pp. 1152-1155, 1997.

Maughan et al., "Security Associatesion: Building Blocks for Secure Communications", IEEE -Symposium on Computers and Communications, pp. 15, 1995.

Araki, "Linux Security Diary, Use VLAN in Linux", Linux Japan, Itsutsubashi Research Co.,ltd., vol. 3, No. 11, Nov. 1, 2008, pp. 110-113 (CSDB: National Academy Paper 200300158009.

Burns, et al., "Allocation and Data Placement Using Virtual Contiguity", pp. 1-6.

Chao, "Next Generation Routers," Proceedings of the IEEE. vol. 90 No. 9 Sep. 2002.

Chen, et al., "Performance Prediction of Component-based Applications", available at least as early as Jan. 10, 2007, at <<http://www.ug.it.usyd.edu.au/~iango/papers/jss_paper_draft_0503,pdf>>, pp. 1-12.

Chunxiao, et al., Configure and move the e-Commerce Business Model by Utilizing XML, Applications of Computer Systems, No. 2, p. 8-11.

Dekhil, et al., "Generalized Policy Model for Application and Service Management", Hewlett-Packard Laboratories, Software Technology Lab, 3 pages.

Frolund, et al., "Design-Time Simulation of a Large-Scale, Distrubuted object System" ACM 1998, pp. 374-400.

Garschhammer, et al., "Towards generic Service Management Concepts A Service Model Based Approach", 14 pages.

Harbour, et al., "MAST An Open Environment for Modeling, Analysis, and Design of Real-Time Systems", available at least as early as Jan. 10, 2007, at <<http://citeseer.ist.psu.edu/cache/papers/cs/30959/http:zSzzSzwww.ctr.unican. eszSzpublicationszSzmgh-jlm-jjg-jcp-jmd-2002a.pdf/mast-an-open-environment.pdf>>, pp. 1-16.

Hardwick, et al., "Modeling the Performance of E-Commerce Site", Jan. 6, 2007, at <<http://www.cs.cmu.edu/~jch/publications/hardwick01modeling.htrnl>>, Journal of Computer Resource Management, 2002, pp. 1-11.

Howard et al., "Designing Secure Web-Based Applications for Microsoft Windows 2000", 2000.

"Integrated Secruity Management", OpenPMF(Policy Managment Framework), 2 pages.

Kounev, "A Capacity Planning Methodology for Distributed E-Commerce Applications", Jan. 2, 2001, pp. 1-13.

Levillain, et al., "Switch-Based Server Load Balancing for Enterprises," Alcatel Telecommunications Review; No. 4 pp. 298-302; 2002.

Liu et al., "Visualization in Network Topology Optimization", ACM, 1992, pp. 131-138.

Mahon, "OpenView PolicyXpert: Heterogeneous Configuration and Control", OpenView Policy-Based Network Management, Feb. 1999, 4 pages.

Miyamoto, et al., "VLAN Management System on Large-scale Network," Journal of Information Processing Society of Japan, vol. 41, No. 12, pp. 3234-3244, the Information Processing Society of Japan, Dec. 15, 2000. (CSDB: National Academy Paper 200200108005).

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz..zSzIMACS97x.pdf/simalytic-hybrid-modeling-planning.pdf>>, Colorado Technical University, 1997, pp. 1-7.

Shi et al., "An Effective Model for Composition of Secure Systems", The Journal of Systems and Software, 1998, pp. 233-244.

Somers, "Hybrid: Unifying Centralised and Distributed Network Management using Intelligent Agents" IEEE Network Operations and Management Symposium Kyoto Apr. 15-19, 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Vadim, "On Virtual Data Centers and Their Operating Environments", at <<http://www.hpl.hp.com/techreports/2001/HPL-2001-44.html>>, Mar. 8, 2001, pp. 1-20.

Yuhui, e-Commerce Based on ERP for Enterprise by Utilizing DNA and XML, Computer Engineering, vol. 27, No. 6, p. 165, 166, 182.

Lee, et al., "Community Services: A Toolkit for Rapid Deployment of Network Services", Proceedings of the IEEE International Conference on Cluster Computing, Cluster 2002, IEEE, 2002, 4 pages.

Meli, "Measuring Change Requests to support effective project management practices", Proc of the ESCOM 2001, London, Apr. 2001, pp. 25-34.

Microsoft.com, "System Definition Model", retrieved at <<http://web.archive.org/web/20040405230803/www.microsoft.com/windowsserversystem/dsi/sdm.mspx>>, Mar. 31, 2004, 4 pages.

PCT Intl Search Report and Written Opinion for Application No. PCT/US2006/038856, dated Feb. 20, 2007, 9 pgs.

Office Action from the Patent Office of the State Intellectual Property Office of the People's Republic of China, Application No. 200410028615.1, mailed on Feb. 18, 2008, 17 pages.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

Translated the Japanese Office Action mailed on Jan. 26, 2007 for Japanese Patent Application No. 2001-326848, a counterpart foreign application of US Patent No. 6,886,038.

Translated copy of the Japanese Office Action mailed on Dec. 14, 2007 for Japanese Patent Application No. 2001-326848, a counterpart foreign application of US Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Meader, P., "Build Distributed Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

"System Definition Model," Windows Server System Home, http://www.microsoft.com/windowsserversystem/dsi/sdm.mspx.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, 2001, http://www.hpl.hp.com/techreports/2001/HPL-2001-276.pdf.

Office Action for Russian Application No. 2004-117219 mailed on Oct. 7, 2008, 5 pgs.

Heinl, et al., "A Comprehensive Approach to Flexibility in Workflow Management Systems", WACC 1999, ACM, 1999, pp. 79-88.

Morimotoet al., "Compatability Testing for Windows Server 2003", Microsoft Windows Server 2003 Unlesahed, Chapter 18, Section 1, Jun. 14, 2004, 2 pages.

* cited by examiner

SECURITY ASSOCIATIONS FOR DEVICES

FIELD

The present invention relates to procuring trusted associations between at least two parties.

BACKGROUND

Secret key encryption is implemented by a sending party encrypting data to be transmitted using a key, transmitting the key and the encrypted data to a receiving party either separately or together over a network connection, and the receiving party using a same key to decrypt the received data. A public key infrastructure (hereafter "PKI") is implemented by the sending party encrypting data to be transmitted using a public key corresponding to the receiving party, transmitting the encrypted data to the receiving party over a network connection, and the receiving party using its private key to decrypt the received data. However, the trust required for sharing both secret keys for secret key encryption and public keys for PKI is being breached at an alarmingly increasing rate among distributed network appliances, particularly in constrained situations such as securing a boot among multiple appliances or nodes over a network.

SUMMARY

Secure network associations among plural devices are described herein.

Generating symmetric keys among distributed appliances, includes generating public and private key values one at least one appliance, receiving a public key value from another appliance via an out-of-band third party mechanism, and generating a secret value as a function of the private key value corresponding to the local appliance and the public key value received from the other appliance.

BRIEF DESCRIPTION OF THE DRAWINGS

The scope of the present invention will be apparent from the following detailed description, when taken in conjunction with the accompanying drawings, and such detailed description, while indicating embodiments of the invention, are given as illustrations only, since various changes and modifications will become apparent to those skilled in the art from the following detailed description, in which.

DETAILED DESCRIPTION

Figure 1:
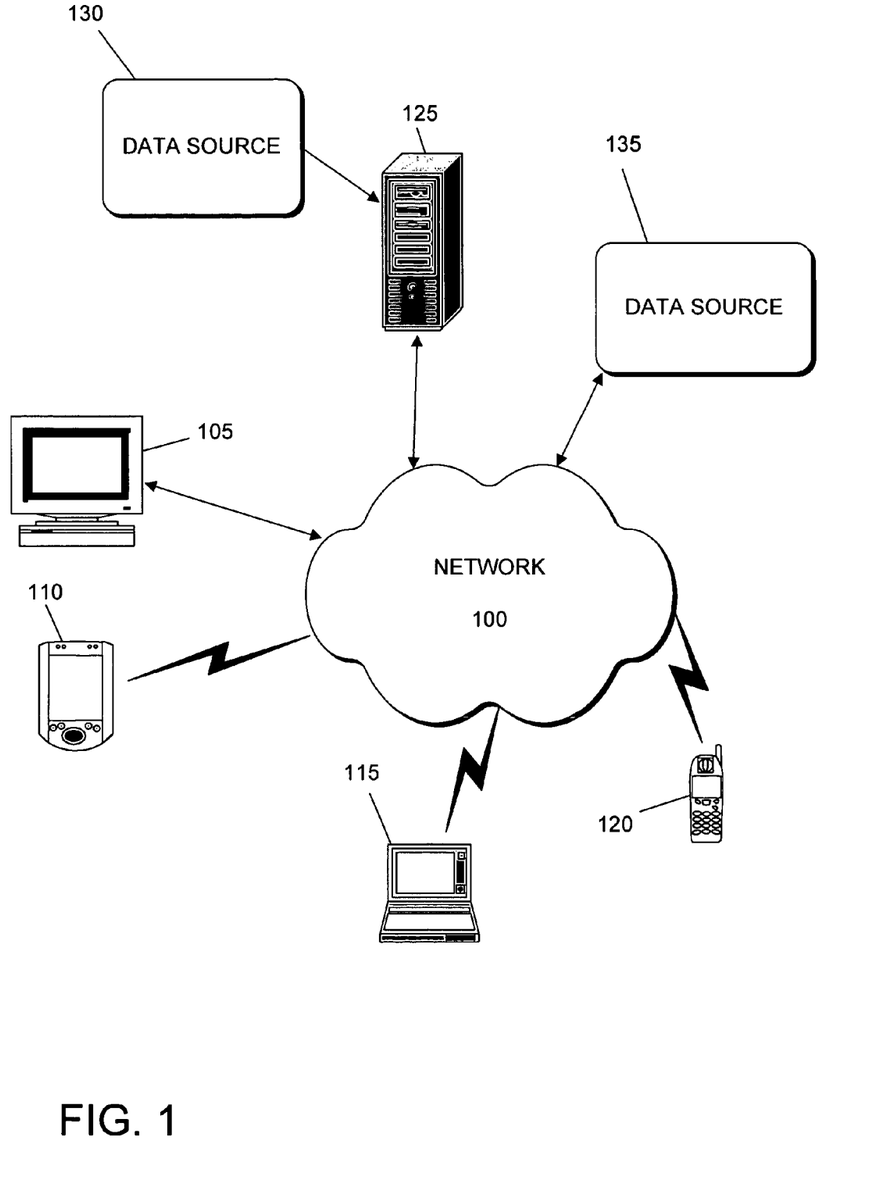
FIG. 1 shows a client/network system in accordance with example embodiments.

In the example network environment of FIG. 1, multiple client computing devices 105, 110, 115, and 120, which are also referred to as client devices, are coupled to each other and to at least one server device 125 via network 100. Network 100 is intended to represent any of a variety of conventional network topologies and types, which may include wired and/or wireless networks. Network 100 may further utilize any of a variety of conventional network protocols, including public and/or proprietary protocols. Network 100 may include, for example, the Internet as well as possibly at least portions of one or more local area networks (LANs).

Client device 105 may include any of a variety of conventional computing devices, including a desktop personal computer (PC), workstations, mainframe computers, Internet appliances, and gaming consoles. Further client devices associated with network 100 may include personal digital assistant (PDA) 110, laptop computer 115, and cellular telephone 120, etc., which may be in communication with network 100 by a wired and/or wireless link. Further still, one or more of client devices 105, 110, 115, and 120 may include the same types of devices, or alternatively different types of devices.

Server device 125 may provide any of a variety of data and/or functionality to computing devices 105, 110, 115, and 120. The data may be publicly available or alternatively restricted, e.g., restricted to only certain users or available only if the appropriate fee is paid, etc. Server device 125 is at least one of a network server, an application server, a web blade, or any combination thereof. Server device 125 is any device that is the source of content, and client devices 105, 110, 115, and 120 include any devices that receive such content.

At data source 130 or 135, software programs, including operating systems and applications, are prepared for and/or provided to any one of server device 125 or client devices 105, 110, 115, and 120 for loading and/or execution. For the sake of consistency, the discussion hereafter refers to "applications" which encompass anyone of, at least, operating systems, programs, and applications, as known in the art, either singularly or in combination.

Figure 2:
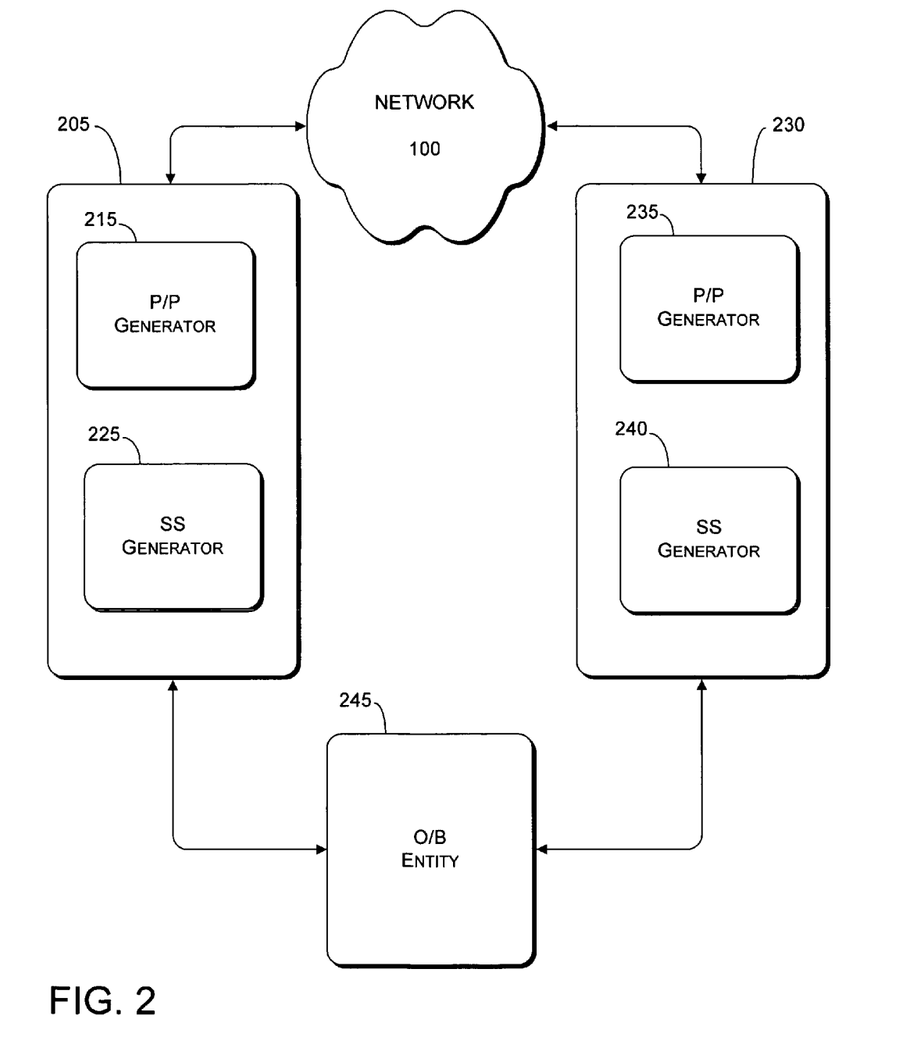
FIG. 2 shows an association of devices in accordance with an example embodiment.

Secure associations between any of client devices 105, 110, 115, 120, server device 125, and data sources 130 and 135 is described herein with reference to the example embodiment of FIG. 2.

In particular, the example embodiment of FIG. 2 shows how a trust relationship is established between device 205 and device 230, with devices 205 and 230 representing any one of client devices 105, 110, 115, 120, server device 125, and data sources 130 and 135. Such devices may alternatively be regarded as network nodes. Trust relationships, or secure associations, in accordance with the example embodiments described herein, may be implemented by establishing a shared secret without requiring a high degree of trust for the dissemination of information between devices. The trust relationship may be established for the purposes that include, but are not limited to, exchanging information, e.g., e-mail, or for remotely loading an operating system (OS) from one node to another.

According to the example embodiment of FIG. 2, a trust relationship between devices 205 and 230 is not established over network 100, over which devices 205 and 230 are communicatively coupled, but rather using a third-party out-of-band, i.e., asynchronous, entity. Such entity, which will be referred to hereafter as "out-of-band mechanism" 245 may include, but is not limited to, any one of: a serial cable, a USB cable, an infrared-connection, a personal digital assistant (PDA), a flash memory, a memory stick, a barcode, and a smartcard. Out-of-band mechanism 245 may be program-driven or require user-intervention. Serial cable, USB cable, and infrared-compatible examples of out-of-band mechanism 245 may be alternatively program-driven or user-implemented. Peripheral devices such as a PDA, a flash memory, a memory stick, a barcode, and a smartcard serving as out-of-band mechanism 245 require physical transfer from one device to another, and therefore require user-intervention in order for data to be downloaded to a destination device.

According to a first embodiment, symmetric keys are established on at least devices 205 and 230 using the Diffie-Hellman cryptographic protocol. In particular, generator 215 on device 205 and generator 235 on device 230 each produce a local public/private key pair for the respective devices. The public key values generated on devices 205 and 230 are exchanged via out-of-band mechanism 245. Thus, having imported the public key value generated on the other device via out-of-band mechanism 245, devices 205 and 230 are able to produce a shared secret as a function of the imported public key value and the local private key value by executing a Diffie-Hellman computation, which is known in the art and is therefore not described in detail here.

That is, shared secret generator 225 on device 205 produces a Diffie-Hellman shared secret as a function of the private key value produced by generator 215 and the public key value imported from device 230 via out-of-band mechanism 245. Further, shared secret generator 240 on device 230 produces a Diffie-Hellman shared secret as a function of the private key value produced by generator 235 and the public key value imported from device 205 via out-of-band mechanism 245. As is known in the art with regard to the Diffie-Hellman cryptographic technique, by exchanging public keys, the shared secret key values generated on devices 205 and 230 are the same, i.e., symmetric, but neither device is required to export either a private key value or the shared secret value over a network. Rather, only a public key value is transmitted from one device to another, and that over an out-of-band mechanism, requiring only a low level of trust.

The Diffie-Hellman secret value generated at each of the devices is used for encryption/decryption or other known authentication purposes.

The embodiment of FIG. 2 may also establish a secret value to be shared among at least devices 205 and 230 using the Rivest-Shamir-Adleman (hereafter "RSA") cryptographic protocol. According to such example embodiment, a secret value is produced on one of devices 205 and 230, and exported to the other node via out-of-band mechanism 245 while protected by the public key value corresponding to the destination device.

Specifically, to implement the RSA protocol, devices 205 and 230 are to produce a public key value, though only one of the devices is needed to produce a private key value. The private key value is produced on the device that is to generate the secret value to be shared. The description of the example embodiment continues assuming that generator 215 on device 205 and generator 235 on device 230 each produce a local public/private key pair for the respective devices, though such example is not limiting.

Assuming that device 205 is to generate the secret value to be shared, the public key value generated by generator 235 on device 230 is imported to device 205 via out-of-band mechanism 245. Shared secret generator 225 on device 205 produces an RSA secret value as a function of the local private key value produced by generator 215 and the public key value imported from device 230 via out-of-band mechanism 245. As is known in the art with regard to the RSA cryptographic technique, the secret value is then shared with device 230 by encrypting the secret value using the imported public key value, i.e., the public key value imported to device 205 from device 230 via out-of-band mechanism 245. Out-of-band mechanism 245 is then utilized again to export the secret value to device 230, with the secret value protected by the public key value of device 230. Thus, devices 205 and 230 benefit from sharing the secret value, which is then used for encryption/decryption or other known authentication purposes.

An example implementation for the embodiments described herein includes providing a secure boot over a network wherein boot loader code resides on the firmware of a network appliance. A description of such an example is hereby described with reference to the example embodiment of FIG. 2 and the example processing flow shown in FIG. 3. This description is exemplary only, and is not intended to be limiting in any manner. Further, the processing of FIG. 3 is not intended to be limiting in terms of order of actions taken since, as will become evident from the description, any sequence in the processing may be varied.

Figure 3:
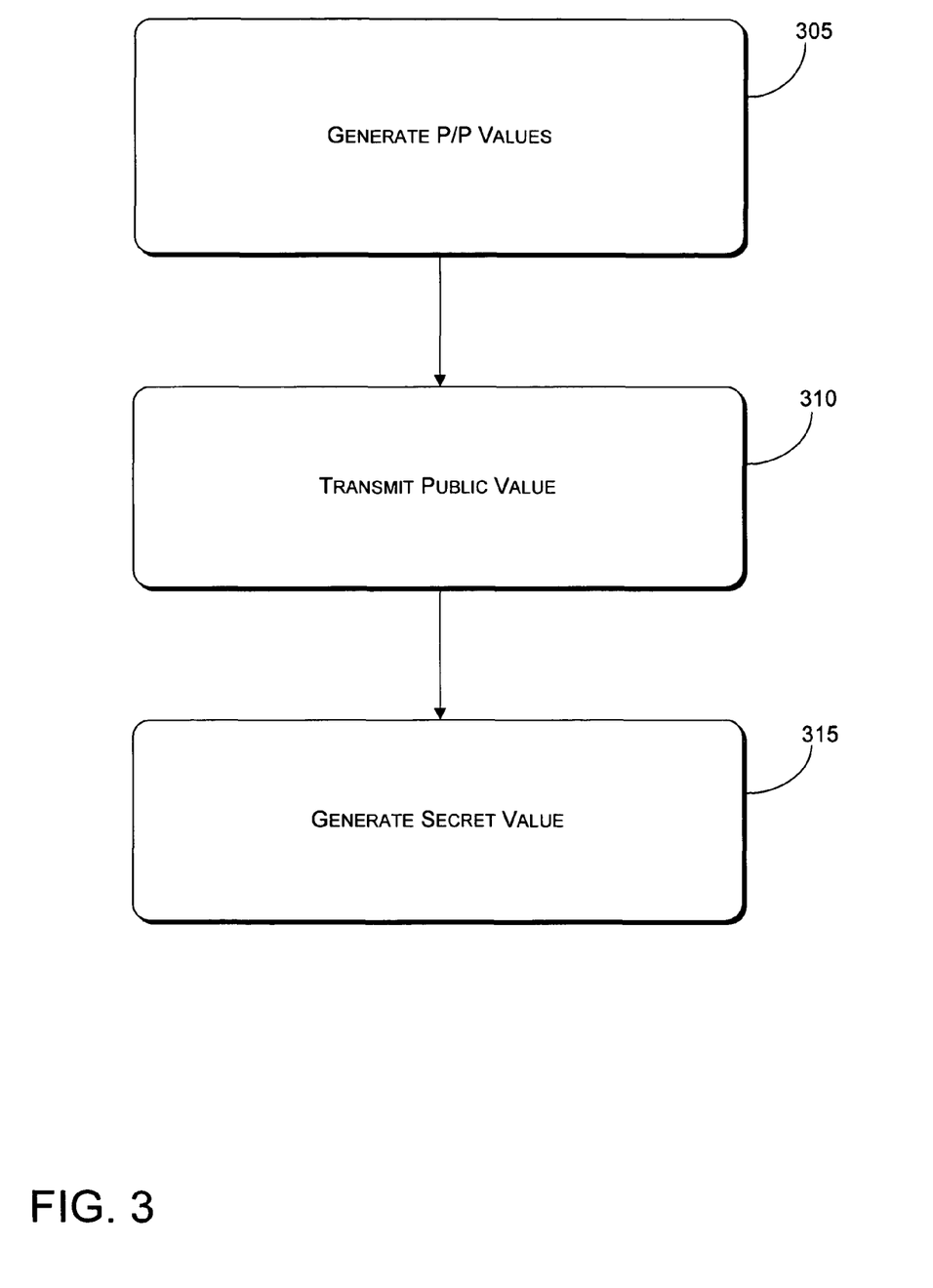
FIG. 3 illustrates a processing flow in accordance with an example embodiment.

The processing of FIG. 3 is described with regard to the example of FIG. 2 whereby device 205 represents a RADIUS client and device 230 represents a RADIUS server. Remote Authentication Dial-In User Service (RADIUS) is an authentication service that allows a service infrastructure to maintain user profiles in a centralized database residing on an authentication server, and the profiles are then accessed by remote access servers.

When RADIUS client 205 attempts to remotely load an OS, the profile of which is stored on RADIUS server 230, public/private key values are generated 305 by generator 215 on RADIUS client 205. The public key value generated on RADIUS client 205 is exported 310 to RADIUS server 230 via out-of-band mechanism 245.

Public/private key values are also generated 305 on RADIUS server 230 by generator 235, either simultaneously with the generation of the public/private key values on RADIUS client 205 or, more likely, in response to receiving the public key value from RADIUS client 205 at RADIUS server 230. The public key value generated on RADIUS server 230 is exported 310 to RADIUS client 205 via out-of-band mechanism 245.

Generator 240 on RADIUS server 230 generates 315 a shared secret value by executing a Diffie-Hellman computation, with the shared secret being computed as a function of the private key value generated by generator 235 and the public key value imported from RADIUS client 205 via out-of-band mechanism 245.

Similarly, generator 225 on RADIUS client 205 generates 315 a shared secret value by executing a Diffie-Hellman computation, with the shared secret being computed as a function of the private key value generated by generator 215 and the public key value imported from RADIUS server 230 via out-of-band mechanism 245.

The secret values generated by generator 225 and generator 240 are symmetric, in accordance with the fundamental principals of the Diffie-Hellman encryption technique.

Alternatively, the secure boot of an OS from RADIUS server 230 on RADIUS client 205 can also be implemented using an RSA encryption technique. The description of such embodiment is described with reference to the examples of FIGS. 2 and 4. Further, the example is described under the assumption that RADIUS client 205 initiates the establishment of the trust relationship between RADIUS client 205 and RADIUS server 230, although such example is not limiting. It is noted that the depiction and number of the blocks of FIGS. 3 and 4 do not imply a strict order. Rather, the ordering described is by way of example only.

Figure 4:
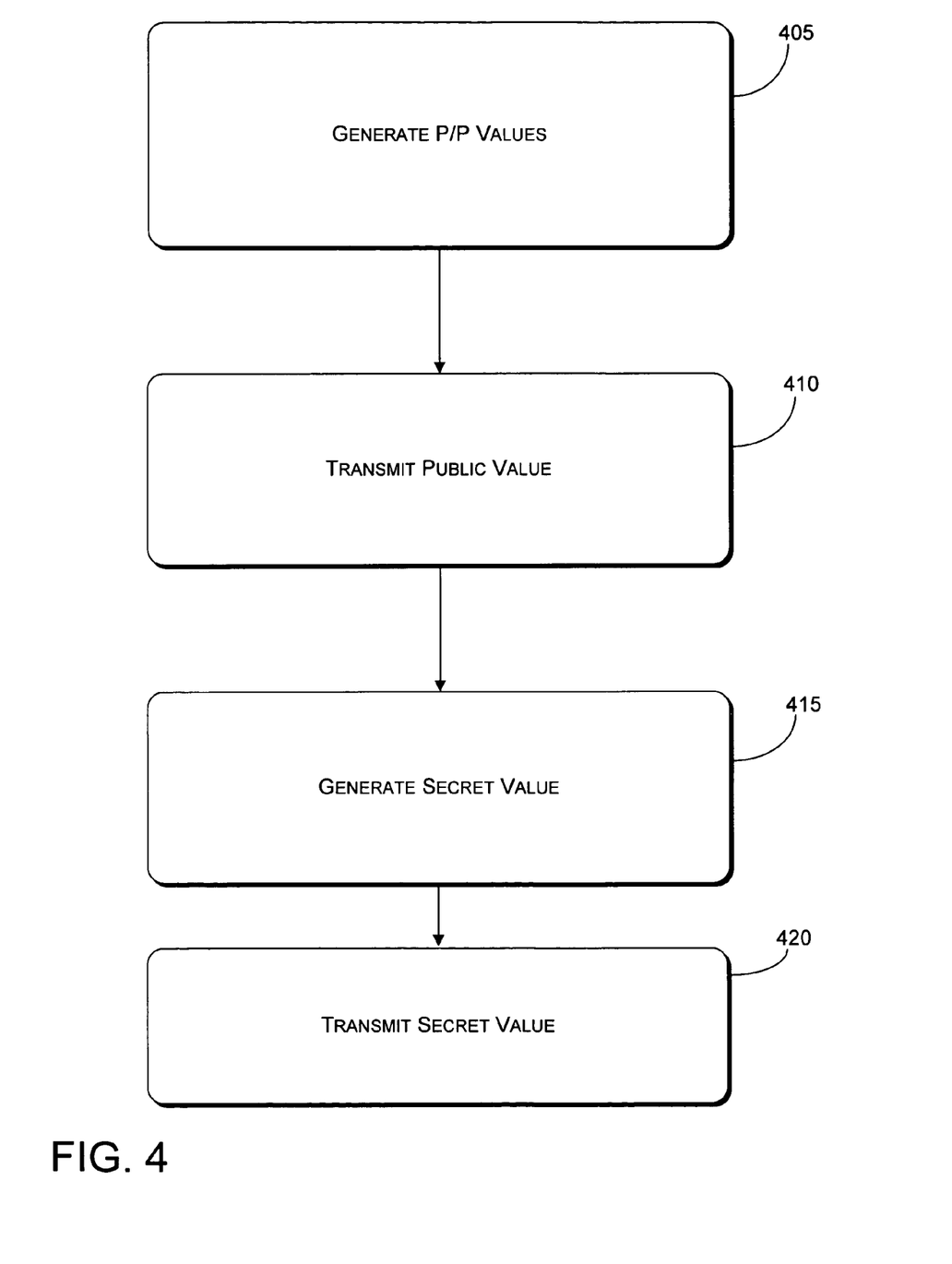
FIG. 4 illustrates another processing flow in accordance with an example embodiment.

Therefore, by FIG. 4, when RADIUS client 205 attempts to remotely load an OS, the profile of which is stored on RADIUS server 230, public/private key values are generated 405 by generator 215 on RADIUS client 205. The public key value generated on RADIUS client 205 is exported 410 to RADIUS server 230 via out-of-band mechanism 245.

Public/private key values are also generated 405 on RADIUS server 230 by generator 235, either simultaneously with the generation of the public/private key values on RADIUS client 205 or in response to receiving the public key value from RADIUS client 205 at RADIUS server 230.

Generator 240 on RADIUS server 230 generates 415 a shared secret value by executing an RSA computation, with the shared secret being computed as a function of the private key value generated by generator 235 and the public key value imported from RADIUS client 205 via out-of-band mechanism 245.

The secret value generated on RADIUS server 230 is encoded to be protected by the public key value imported from RADIUS client 205, and exported 420 to RADIUS client 205 via out-of-band mechanism 245.

The techniques described above may also be utilized to establish a trust relationship between any of devices 105, 110, 115, 120, server 125, and data sources 130 and 135, shown in FIG. 1, for alternative purposes including the dissemination of data, e.g. e-mail, establishing a secure link for videoconferencing, etc. That is, the techniques described above utilize an out-of-band entity to reduce the trust required of any network node desiring a trust relationship with at least one other node, regardless of the purpose for such association.

Further, with regard to the example embodiments described herein, it is noted that means and methods for the generation of public/private key values are known in the art, and therefore are not presently described in detail. Similarly, encryption protocols including, but not limited to, the Diffie-Hellman protocol and the RSA protocol, which may be utilized in correspondence with the example embodiments described herein are also known, and therefore a description of such protocols is not provided.

Figure 5:
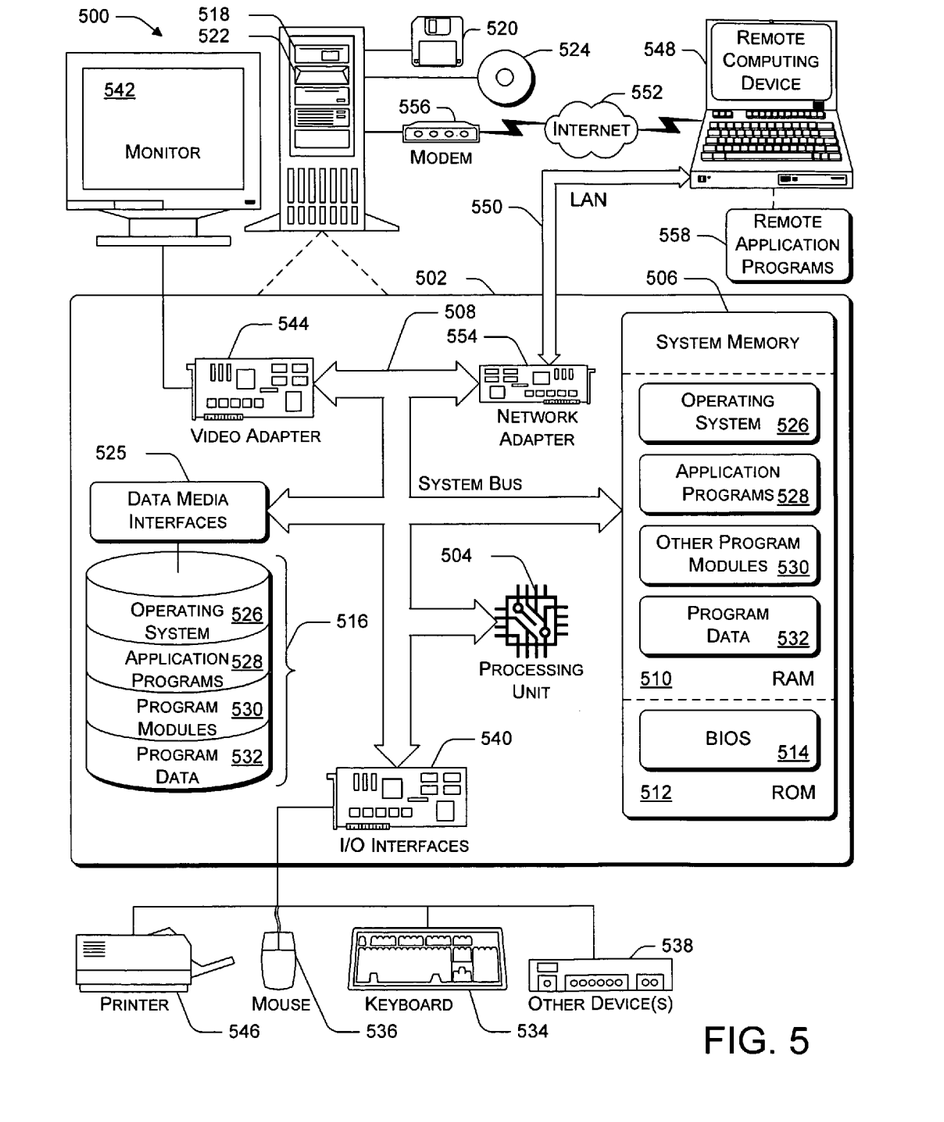
FIG. 5 illustrates a general computer network environment which can be used to implement the techniques described herein.

FIG. 5 illustrates a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. The components of computer 502 can include, but are not limited to, one or more processors or processing units 504, system memory 506, and system bus 508 that couples various system components including processor 504 to system memory 506.

System bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 502 may include a variety of computer readable media. Such media can be any available media that is accessible by computer 502 and includes both volatile and non-volatile media, removable and non-removable media.

System memory 506 includes computer readable media in the form of volatile memory, such as random access memory (RAM) 510; and/or non-volatile memory, such as read only memory (ROM) 512 or flash RAM. Basic input/output system (BIOS) 514, containing the basic routines that help to transfer information between elements within computer 502, such as during start-up, is stored in ROM 512 or flash RAM. RAM 510 typically contains data and/or program modules that are immediately accessible to and/or presently operated on by processing unit 504.

Computer 502 may also include other removable/non-removable, volatile/non-volatile computer storage media. By way of example, FIG. 5 illustrates hard disk drive 516 for reading from and writing to a non-removable, non-volatile magnetic media (not shown), magnetic disk drive 518 for reading from and writing to removable, non-volatile magnetic disk 520 (e.g., a "floppy disk"), and optical disk drive 522 for reading from and/or writing to a removable, non-volatile optical disk 524 such as a CD-ROM, DVD-ROM, or other optical media. Hard disk drive 516, magnetic disk drive 518, and optical disk drive 522 are each connected to system bus 508 by one or more data media interfaces 525. Alternatively, hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, removable magnetic disk 520, and removable optical disk 524, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 516, magnetic disk 520, optical disk 524, ROM 512, and/or RAM 510, including by way of example, operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as keyboard 534 and a pointing device 536 (e.g., a "mouse"). Other input devices 538 (not shown specifically) may include a microphone, joystick, game pad, satellite dish, serial port, scanner, and/or the like. These and other input devices are connected to processing unit 504 via input/output interfaces 540 that are coupled to system bus 508, but may be connected by other interface and bus structures, such as a parallel port, game port, or a universal serial bus (USB).

Monitor 542 or other type of display device can also be connected to the system bus 508 via an interface, such as video adapter 544. In addition to monitor 542, other output peripheral devices can include components such as speakers (not shown) and printer 546 which can be connected to computer 502 via I/O interfaces 540.

Computer 502 can operate in a networked environment using logical connections to one or more remote computers, such as remote computing device 548. By way of example, remote computing device 548 can be a PC, portable computer, a server, a router, a network computer, a peer device or other common network node, and the like. Remote computing device 548 is illustrated as a portable computer that can include many or all of the elements and features described herein relative to computer 502. Alternatively, computer 502 can operate in a non-networked environment as well.

Logical connections between computer 502 and remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, computer 502 is connected to local network 550 via network interface or adapter 554. When implemented in a WAN networking environment, computer 502 typically includes modem 556 or other means for establishing communications over wide network 552. Modem 556, which can be internal or external to computer 502, can be connected to system bus 508 via I/O interfaces 540 or other appropriate mechanisms. It is to be appreciated that the illustrated network connections are examples and that other means of establishing at least one communication link between computers 502 and 548 can be employed.

In a networked environment, such as that illustrated with computing environment 500, program modules depicted relative to computer 502, or portions thereof, may be stored in a remote memory storage device. By way of example, remote application programs 558 reside on a memory device of remote computer 548. For purposes of illustration, applications or programs and other executable program components such as the operating system are illustrated herein as discrete blocks, although it is recognized that such programs and components reside at various times in different storage components of computing device 502, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed:

1. An out-of-band method implemented on a computing device having instructions executable by a processor for asynchronously establishing a secure association with a server node, the method comprising:
   generating a local public value and a local private value on a client node:
      in response to an attempt to remotely load an operating system by the client node, wherein a profile of the operating system is stored on the server node; or
      simultaneously with a generation of the local public value and the local private value on the server node;
   allowing a client node to exchange information for remotely loading an operating system from one node to another node;
   loading the operating system on the client node;
   storing the public value for configuration of the secure association on an out-of band computer-readable storage medium, wherein the stored public value is not used for authentication;
   transporting the out-of-band computer-readable storage medium to the server node to establish a trust relationship allowing for remotely loading the operating system on the client node from the server node, wherein a low level of trust is required as the trust relationship required between the client node and the server node is established by using a third party out-of-band entity;
   receiving from the server node a public value generated by the server node via the out-of-band computer-readable storage medium, wherein the public value generated by the server node is generated with a private value generated by the server node in response to receiving the public value from the client node;

generating a secret value using the local private value in combination with the public value received from the server node; wherein the receiving is asynchronous to the generating the secret value; and producing the secret value as a function of a local private value; and sharing the secret value by encrypting the secret value using an imported public key value, the public key value imported via the out-of-band mechanism.

2. A method according to claim 1, wherein the method is performed on both of a pair of nodes, and wherein further the secret values generated at both of the nodes are symmetric.

3. A method according to claim 2, wherein the generating a secret value includes performing a Diffie-Hellman computation.

4. A method according to claim 1, further comprising:
retaining the secret value locally;
protecting the secret value using the public value received from the other node; and
transmitting the protected secret value to the other node via the out-of-band mechanism.

5. A method according to claim 4, wherein the generating a secret value includes performing a Rivest-Shamir-Adleman (RSA) computation.

6. A method according to claim 1, wherein the receiving of the public value from the other node via an out-of-band mechanism includes downloading the public value from an external device.

7. A method according to claim 6, wherein the external device is any one of a personal digital assistant (PDA), flash memory, memory stick, barcode, smart card, USB-compatible device, Bluetooth-compatible device, and infrared-compatible device.

8. A computer-readable storage medium having one or more instructions causing one or more processors to:
generate a local two-part code having a public code component and a private code component:
in response to an attempt to allow a processor to remotely load an operating system by a client node from another processor, wherein a profile of the operating system is stored on the another processor; or
simultaneously with a generation of the two-part code by a server node;
load the operating system on the processor;
store the public component on a peripheral out-of-band device which is then transported over an out-of-band mechanism to the another processor for configuration of a secure association and not authentication, wherein a low level of trust is required for transport as a trust relationship required between the processor and the another processor is established by using a third party out-of-band entity;
receive the public code component asynchronously from another processor via the peripheral device;
generate a secret value using the local private code component and the public code component received from the other processor;
produce the secret value as a function of a local private value; and
share the secret value by encrypting the secret value using an imported public key value, the public key value imported via the out-of-band mechanism.

9. A computer-readable storage medium according to claim 8, wherein the one or more instructions are executed on the other processor, and wherein further the secret value is symmetrical to the secret value generated on the other processor.

10. A computer-readable storage medium according to claim 8, wherein the one or more instructions to generate a secret value includes one or more instructions to perform a Diffie-Hellman computation.

11. A computer-readable storage medium according to claim 8, further comprising one or more instructions causing one or more processors to:
encode the secret value using the public code component received from the other processor; and
transmit the encoded secret value to the other processor via the peripheral device.

12. A computer-readable storage medium according to claim 11, wherein the one or more instructions to generate a secret value includes one or more instructions to perform an RSA computation.

13. A computer-readable storage medium according to claim 8, wherein the one or more instructions to receive the public code component from the other processor via the peripheral device includes downloading the public code component from one of a personal digital assistant (PDA), flash memory, memory stick, barcode, smart card, USB-compatible device, Bluetooth-compatible device, and infrared-compatible device.

14. An apparatus, comprising:
a computer-readable storage medium;
a key generator on a first node to generate a local public/private key pair based on:
in response to an attempt to remotely load an operating system by the first node, wherein a profile of the operating system is stored on a second node; or
simultaneously with a generation of the local public/private key pair on the second node;
a computer processor executing code to write the local public/private key pair to an out-of-band computer-readable storage medium to facilitate setup of a secure association and not for authentication, wherein the secure association allows the first node to remotely load an operating system having a profile stored on a second node;
a shared secret generator on the second node to receive the public key from the first node via the out-of-band computer-readable storage medium connection without requiring a high degree of trust between the first node and the second node as a trust relationship required between the first node and the second node is established by using a third party out-of-band entity; and
the shared secret generator to generate a shared secret using the local private key and the public key received from the first node, wherein the shared secret is generated in response to receiving the public key from the first node.

15. An apparatus according to claim 14, wherein the shared secret is symmetrical to a shared secret generated on the other node using the local public key and a private key corresponding to the other node.

16. An apparatus according to claim 14, wherein the other node is a server.

17. An apparatus according to claim 14, wherein the shared secret generator is to generate a shared secret by performing a Diffie-Hellman computation.

18. An apparatus according to claim 14, further comprising an encoder to encode the secret value using the public key received from the other node and to transmit the encoded secret value to the other node via the out-of-band connection.

19. An apparatus according to claim 18, wherein the shared secret generator is to generate a shared secret by performing an RSA computation.

20. An apparatus according to claim 14, wherein the out-of-band connection includes any one of a personal digital assistant (PDA), flash memory, memory stick, barcode, smart card, USB-compatible device, Bluetooth-compatible device, and infrared-compatible device.

21. A method implemented on a computing device having instructions executable by a processor for running a protocol for establishing a trust relationship between two or more processing nodes, the method comprising:
generating a public key and a private key based at least in part:
on each of at least two nodes in response to an attempt of allowing a first node of at least two nodes to remotely load an operating system, wherein a profile of the operating system is stored on a second node of at least two nodes; or
simultaneously with a generation of the public key and the private key on the second node;
exchanging the public keys asynchronously between the at least two nodes using an out-of-band mechanism comprising a computer-readable storage medium wherein the public keys are not used for authentication and without requiring a high degree of trust for an exchange of the public keys between the two nodes as a trust relationship required between the first node and the second node is established by using a third party out-of-band entity; and
calculating a secret to be shared on at least one of the two nodes.

22. A method for running a protocol according to claim 21, wherein the calculating of the secret to be shared includes performing a function using the public key from the other of the two nodes and the private key.

23. A method for running a protocol according to claim 22, wherein the calculating the secret to be shared includes performing a Diffie-Hellman calculation.

24. A method for running a protocol according to claim 22, wherein the secret to be shared is symmetrical on the at least two nodes.

25. A method for running a protocol according to claim 21, further comprising:
encoding the secret to be shared using the public key from the other of the two nodes; and
transmitting the encoded secret to be shared to the other of the two nodes via the out-of-band mechanism.

26. A method for running a protocol according to claim 25, wherein the calculating the secret to be shared includes performing an RSA calculation.

27. A method for running a protocol according to claim 21, wherein the out-of-band mechanism includes any one of a personal digital assistant (PDA), flash memory, memory stick, barcode, smart card, USB-compatible device, Bluetooth-compatible device, and infrared-compatible device.

28. An apparatus, comprising:
means for generating a local public/private key pair based at least in part on:
in response to an attempt to allow a node to remotely load an operating system through a secure association with another node, wherein a profile of the operating system is stored on the another node; or
simultaneously with a generation of the local public/private key pair on the another node;
means for storing a public key on an out-of-band computer-readable storage medium;
means for transporting asynchronously the public key to the another node;
means for receiving at the another node the public key from the out-of-band computer-readable storage medium wherein the public key is used for configuration of the secure association and not used for authentication; and
means for generating a shared secret using the local private key and another public key received from the another node asynchronously via the out-of-band computer-readable storage medium, wherein the another public key is generated by the another node with a private value generated by the another node in response to receiving the public key from the node.

29. An apparatus according to claim 28, wherein the means for generating a shared secret performs a Diffie-Hellman computation.

30. An apparatus according to claim 28, further comprising means for encoding the shared secret using the public key received from the other node.

31. An apparatus according to claim 30, wherein the means for generating a shared secret performs an RSA computation.

32. An apparatus according to claim 28, wherein the out-of-band computer-readable storage medium includes any one of a personal digital assistant (PDA), flash memory, memory stick, barcode, smart card, USB-compatible device, Bluetooth-compatible device, and infrared-compatible device.

* * * * *